July 14, 1970 D. R. PETRIK 3,520,092
PREFABRICATED HOUSE
Original Filed April 9, 1963 6 Sheets-Sheet 1

INVENTOR
DRAGAN R. PETRIK

BY *Norris & Bateman*

ATTORNEYS

July 14, 1970  D. R. PETRIK  3,520,092
PREFABRICATED HOUSE
Original Filed April 9, 1963  6 Sheets-Sheet 2

INVENTOR
DRAGAN R. PETRIK

BY  *Norris & Bateman*

ATTORNEYS

July 14, 1970     D. R. PETRIK     3,520,092
PREFABRICATED HOUSE
Original Filed April 9, 1963     6 Sheets-Sheet 3

INVENTOR
DRAGAN R. PETRIK

BY *Norris & Bateman*

ATTORNEYS

July 14, 1970  D. R. PETRIK  3,520,092
PREFABRICATED HOUSE

Original Filed April 9, 1963  6 Sheets-Sheet 4

INVENTOR
DRAGAN R. PETRIK

BY  *Norris & Bateman*
ATTORNEYS

July 14, 1970  D. R. PETRIK  3,520,092
PREFABRICATED HOUSE
Original Filed April 9, 1963  6 Sheets-Sheet 5

INVENTOR
DRAGAN R. PETRIK

BY Norris & Bateman
ATTORNEYS

July 14, 1970     D. R. PETRIK     3,520,092
PREFABRICATED HOUSE
Original Filed April 9, 1963     6 Sheets-Sheet 6

INVENTOR
DRAGAN R. PETRIK

BY Norris & Bateman
ATTORNEYS

United States Patent Office 3,520,092
Patented July 14, 1970

3,520,092
PREFABRICATED HOUSE
Dragan R. Petrik, 274 Trouw St., Capital Park,
Pretoria, Transvaal, Republic of South Africa
Continuation of application Ser. No. 272,191, Apr. 9,
1963. This application Aug. 19, 1968, Ser. No. 758,648
Int. Cl. E04b 1/12, 1/16, 1/32
U.S. Cl. 52—80
10 Claims

ABSTRACT OF THE DISCLOSURE

A monolithic readily transportable housing unit made of lightweight materials and including spaced innner and outer wall members and thermally insulating material located therebetween, the uint having around its lower end a rim which cooperates with a fixed base at a selected site to mount the house room unit in a desired location. The unit also has an opening in the top and a flanged ring is positioned therein to reinforce and fasten the inner and outer walls together and provide an access opening through which alifting mechanism may be inserted for transporting the unit as a whole from its place of fabrication to its final housing location.

CROSS REFERENCE TO RELATED APPLICATIONS his application is a continuation of application Ser. No. 272,191, filed Apr. 9, 1963, now abandoned.

BACKGROUND OF THE INVENTION

This invention relates generally to prefabricated, easily transportable houses and house room units which are lightweight in construction and posses good thermally insulating characteristics while still providing a sturdy load bearing housing structure.

SUMMARY OF THE INVENTION

Accordingly, the primary object of the invention is to provide a monolithic prefabricated transportable house unit constructed of reasonably cheap materials molded into an integral unit to provide a cheap, but yet sturdy and functional housing assembly.

Another object resides in a provision of a monolithic transportable housing unit including a prefabricated house room unit having around its lower end a rim incorporating means by which it is mounted on a fixed base at a selected site, with the house room unit being made of lightweight materials in molds of required shape and size and including spaced inner and outer walls and a thermally insulating material therebetween. The unit has an opening in the top thereof which receives a flanged ring to reinforce and fasten the inner and outer walls together and provide an access opening through which a lifting mechanism may be inserted for transporting the unit and in which a chimney assembly may be mounted if necessary.

Throughout the objects and specification, the term monolithic house unit refers to one in which the walls and ceiling constructions are prefabricated as an integral unit which is of self load bearing construction. The uints may be prefabricated by mass production industrial techniques at a central factory location, and then, because of their lightweight characteristics, may be readily transported to a housing site and mounted on supporting base pads.

The house room units are advantageous substantially hemispherical with the walls being precast as curved shells, mainly formed from laminated building materials. However, the lightweight house units may be precast in various forms, shapes and sizes and the external walls and main dividing partitions may be built, manufactured, poured, pressed, or blown according to the character of the chosen building material and construction, with the aid of suitable casings, molds, scaffolding and other tools.

The house room unit is lightweight in character and has good thermally insulating qualities which are obtained by employing hard plastics or metal sheets for inner and outer wall structures with a layer of thermal insulating material or an air space interposed therebetween. The building material used may be either a very thin and strong material of sheet construction to render the required strength, low weight and thermally insulating qualities, or alternatively a cheap but porous and weak building material may be used in combination with reinforcing layers to obtain the necessary strength, lightweight and thermally insulating qualities.

The house room unit is lightweight in character and provided with suitable window openings, door openings, ventilation ducts, room dividing partitions, and so on as desired for the particular house construction and room arrangement therein.

Figure 1:
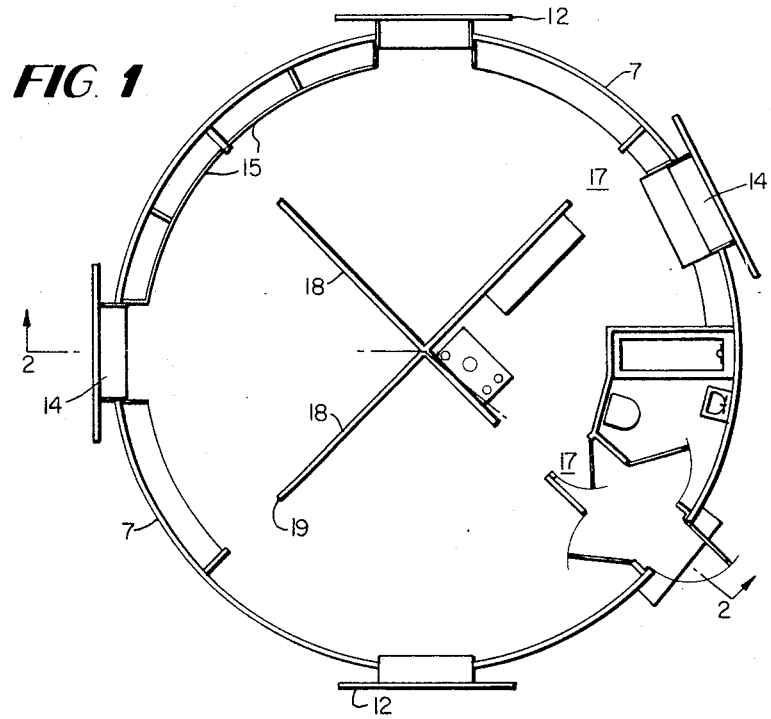
FIG. 1 is a plan view of the ground floor of a prefabricatd monolithic house unit constructed according to the invention.
Figure 3:
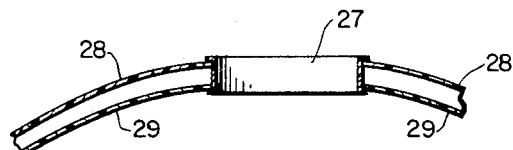
Figure 4:
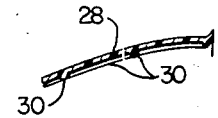
Figure 5:
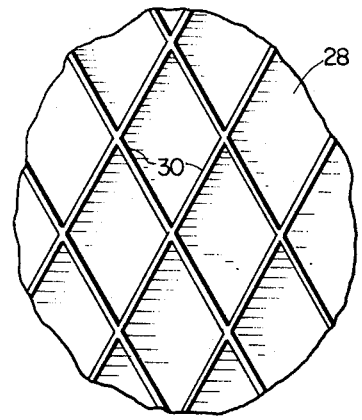
Figure 6:
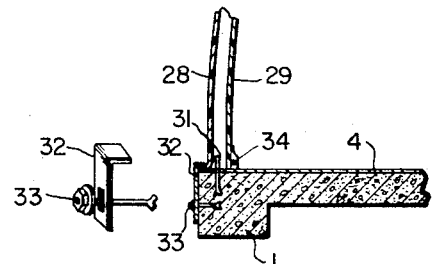
Figure 7:
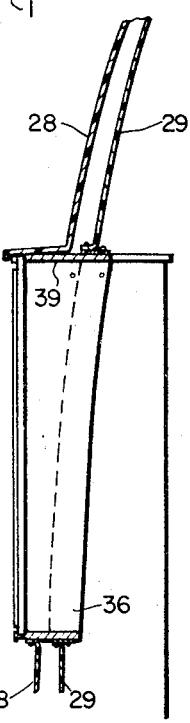
Figure 8:
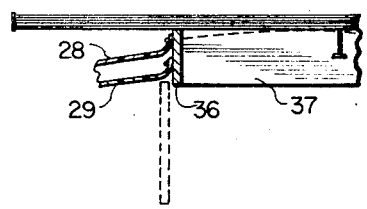
Figure 9:
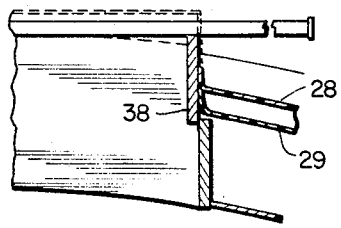
Figure 10:
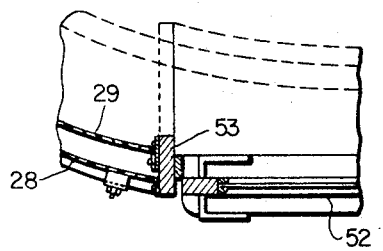
Figure 11:
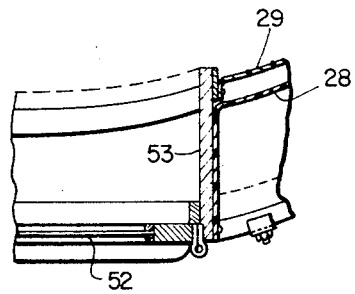
Figure 12:
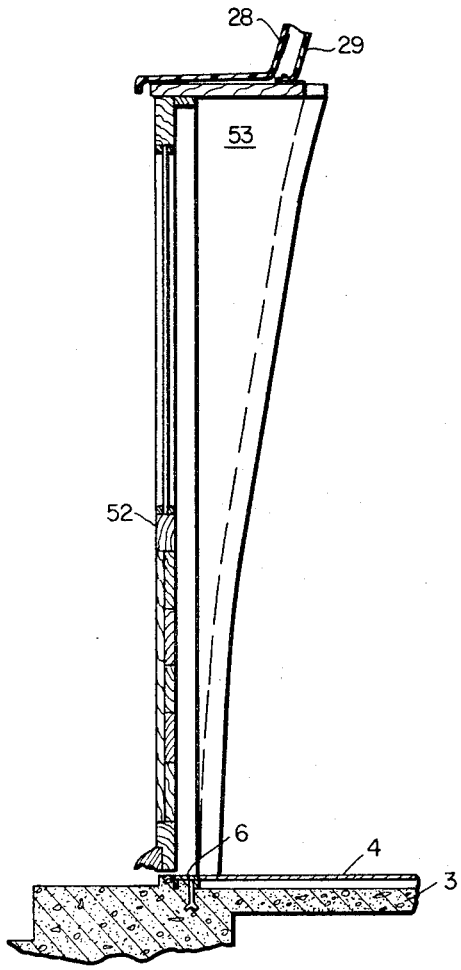
Figure 14:
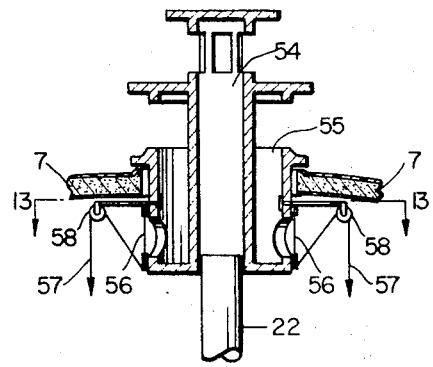
Figure 13:
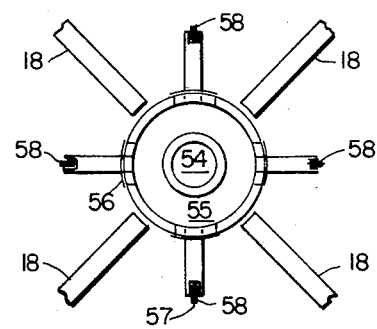
Figure 15:
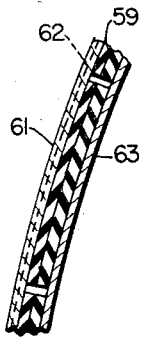
Figure 16:
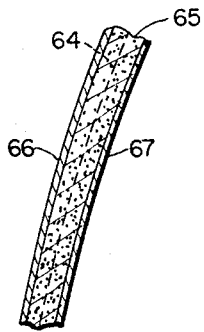
Figure 17:
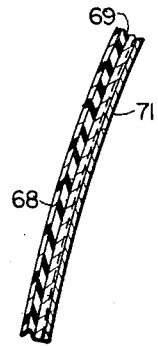
Figure 18:
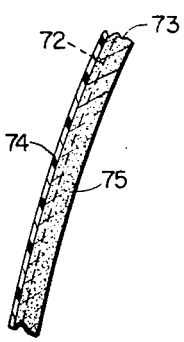
Figure 19:
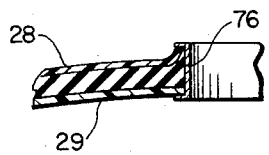
Figure 20:
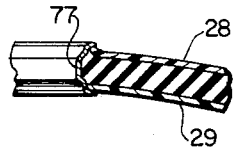
Figure 25:
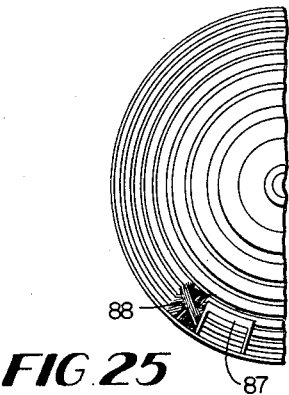
Figure 26:
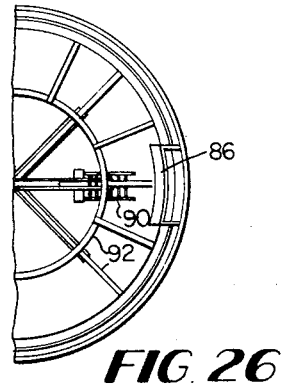
Figure 27:
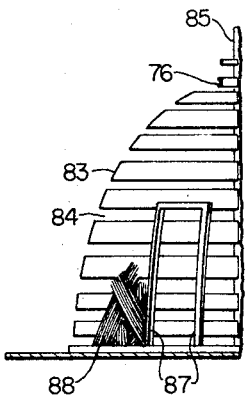
Figure 28:
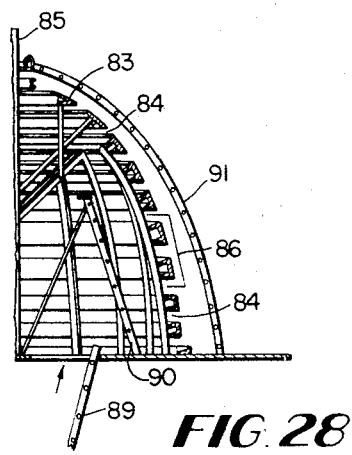
Figure 34:
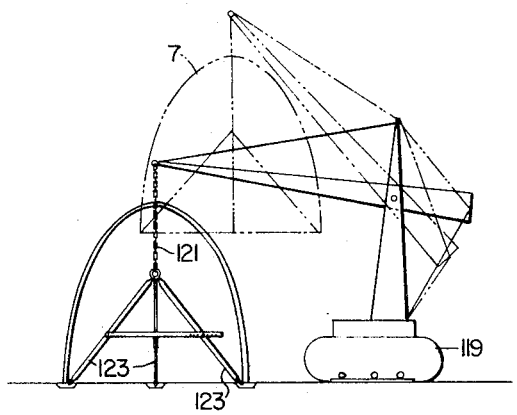
Figure 29:
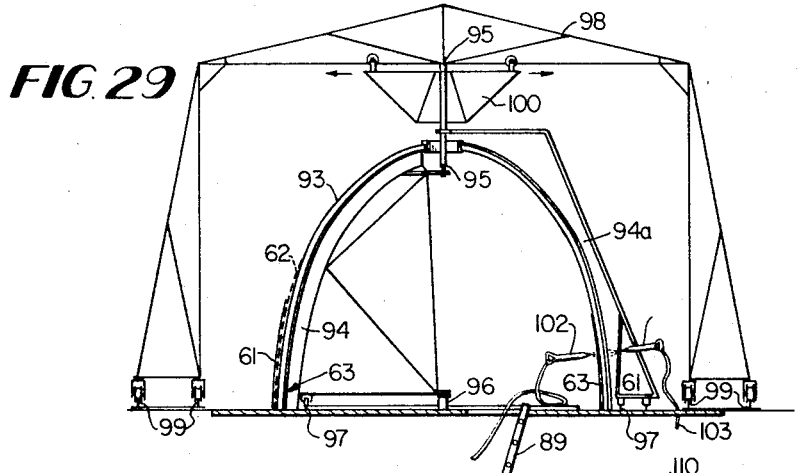
Figure 30:
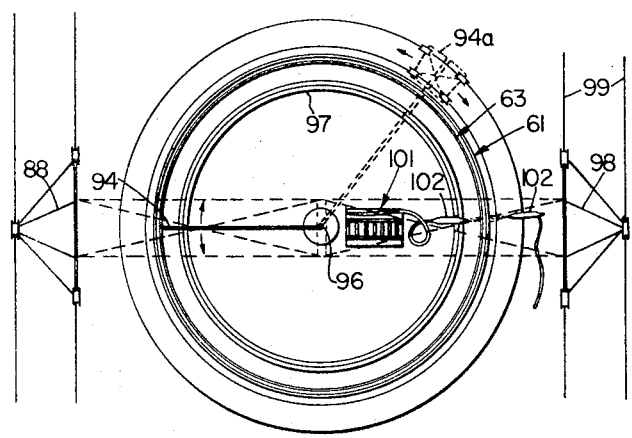
Figure 32:
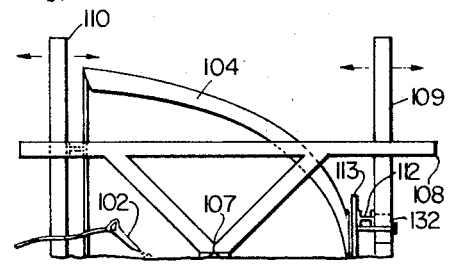
Figure 33:
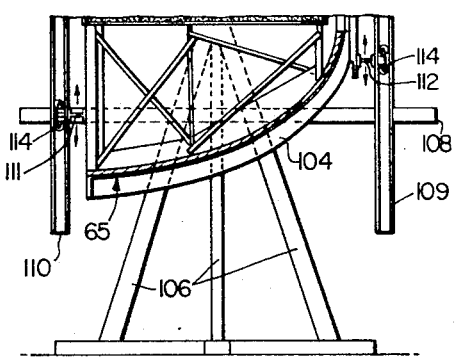
Figure 31:
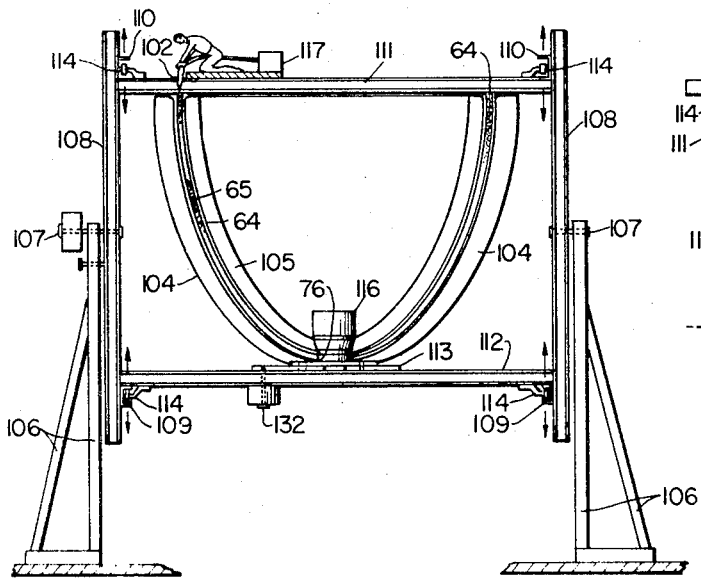

FIG. is an elevational section view taken along line 2—2 of FIG. 1;

FIG. 3 is a fragmentary section view of the central top area of a house unit illustrating a molded or sprayed shell construction formed from plastic materials;

FIG. 4 is a section similar to FIG. 3 and illustrating a plastic wall construction with reinforced ribbing passing therebetween;

FIG. 5 illustrates a reinforcement ribbing configuration which may be employed in the construction of FIG. 4;

FIG. 6 illustrates the manner in which a house unit of plastic wall construction may be mounted on a support base pad at a housing site;

FIG. 7 is an elevation section view of a window mounted in a house room unit;

FIG. 8 is a fragmented plan section view taken along the bottom end of the window of FIG. 7;

FIG. 9 is a view similar to FIG. 8 taken along the upper end of the window of FIG. 7;

FIG. 10 is a sectional plan view through the bottom of an entrance door provided in the house room unit;

FIG. 11 is a sectional plan view of the top of an entrance door;

FIG. 12 is a sectional elevation view of an entrance door within the house room unit;

FIG. 13 is a sectional plan view of a chimney and ventilation assembly at the upper end of the house unit and taken along line 13—13 of FIG. 1;

FIG. 14 is a sectional elevation view of the assembly shown in FIG. 13;

FIG. 15 is a fragmentary section of a wall construction including inner plaster reeds (stocks of plants) or artificial material (plastic tubes) and outer waterproof plaster having a mesh reinforcement;

FIG. 16 illustrates another wall construction including an inner plaster wall, intermediate insulating structure of light Beton or foamy Beton reinforced with a mesh structure, and outside waterproof plaster;

FIG. 17 illustrates another wall construction including an outer asbestos cement wall or other waterproof material, an intermediate thermal insulating layer, and an inner plaster wall including the normal lathing or other base material;

FIG. 18 illustrates another wall construction including an inside mesh wall, an insulating layer of pressed sawdust or shredded paper mixed with lime or other material having good thermal insulating qualities, and an outside wall with sprayed plastic emulsion or other waterproof material, with the inside wall being coated with paint;

FIG. 19 illustrates the flanged ring located within the opening in the upper end of the house room unit securing the wall structure together;

FIG. 20 illustrates a modified flanged ring which may, for example, be a used car wheel;

FIGS. 21 through 24 illustrate various types of base or rim constructions to which the prefabricated house room units are connected, the rims serving to mount the house units on fixed base pads at the selected housing sites;

FIG. 25 is a plan view of a form or casing assembly used for binding plant stocks, reeds or artificial pipes or the like which form the structural load bearing support for the house unit;

FIG. 26 is a plan view similar to FIG. 25 illustrating the form structure for making the house room unit dividing partitions and such;

FIG. 27 is an elevation view of the structure shown in FIG. 25;

FIG. 28 is an elevation view of the structure shown in FIG. 26;

FIG. 29 illustrates apparatus for spray molding the inside and outside wall structures on the load bearing intermediate element which is made and illustrated in FIG. 25 through 28;

FIG. 30 is a top plan view of the apparatus shown in FIG. 29;

FIG. 31 illustrates a scaffolding and removable mold apparatus for casting a house unit according to the invention;

FIG. 32 is a fragmentary elevation view of the scaffolding molding apparatus shown in FIG. 31;

FIG. 33 illustrates apparatus similar to FIGS. 31 and 32 particularly useful in forming partitioned walls within the house room unit structure; and FIG. 34 illustrates the manner in which a finished house unit is lifted and transported to the desired housing site.

DESCRIPTION OF THE PREFERRED EMBODIMENT

Figure 2:
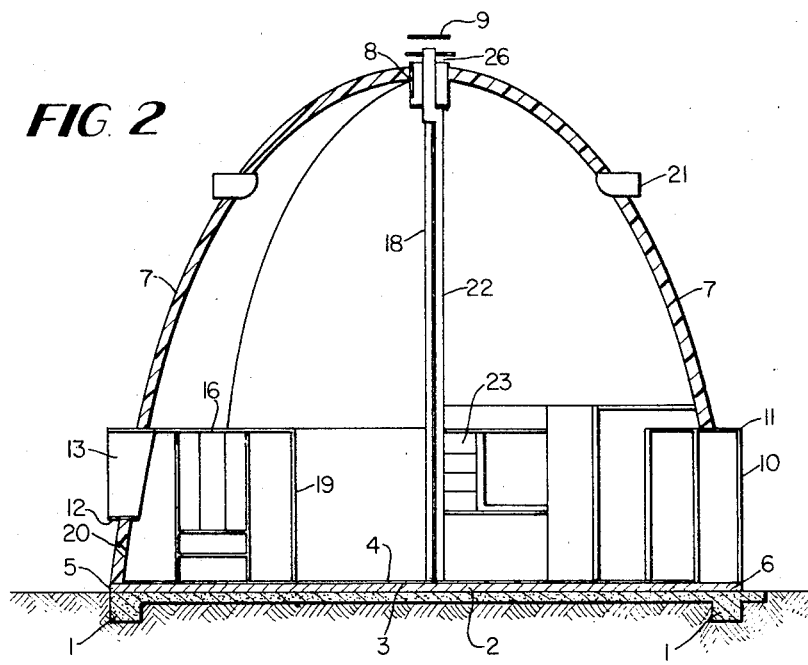

With reference now to the drawings, FIGS. 1 and 2 illustrate a single house unit including three rooms, a kitchen, lobby and bath but it is to be understood that rather than construct a house unit large enough to house a complete family, several smaller units may be used together to provide any desired house size.

The house unit is mounted on a foundation 1 which includes a concrete slab 2 on which may be mounted the house unit floor slab 3 which has a conventional flooring 4 constructed of asphalt tiles or other similar waterproof material. A base ring or rim 5 such as one of those illustrated in FIGS. 21 through 24 is connected to and provides support for the wall structure 7, with the domed wall structure having a threshold 6 fixed to base 5 and an upper opening 8 within which a flanged ring (FIGS. 19 and 20) is mounted and functions to hold the wall structure together. The unit also has a door opening 10 surrounded by door frame 11, a window opening defined by window sill 12 and frame 13.

Internally of the house units are a series of built-in cupboards 15, shelves 16 on top of the cupboards, and inner doors 17 provided in inner wall partitions 18 dividing the unit into a series of rooms. A number of air inlets 20 may be provided throughout the house unit and also a series of built-in glass tubes 21 employed for lighting purposes extend through the house unit wall structure. If necessary a chimney 22 extends vertically through the unit to exhaust heating gases therefrom if a heating unit is provided. The chimney may extend up through the ventilation assembly illustrated in FIGS. 13 and 14 which is readily insertable in the flanged opening 8 at the top of the house unit.

As shown in FIG. 3, the wall structure of the house unit comprises an outer wall 28, an inner wall 29 with insulation material therebetween, with the wall structure being secured together by the flanged ring 27 better illustrated in FIGS. 19 and 20.

Alternatively, the wall structure may include an outer plastic wall 28, an inner plastic wall 29, and reinforcing ribs 30 such as those illustrated in FIG. 5, placed between outer and inner walls 28 and 30.

The wall structure may be connected to a concrete foundation base by bolts 31 and the slotted hook arrangement 32 co-operating with the bolt and nut assembly 33 for fastening the house unit to the foundation base. A sheet band 34 may extend around the inner periphery of the house unit and serve to house such things as telephone and electrical wires.

FIGS. 7 through 9 illustrate an opening in the wall structure in which a window assembly is readily fabricated, the window comprising a frame 36, an inner sill 37, an upper frame portion 39, with a window and screen being slidable in the frame in the conventional manner.

FIGS. 10–12 illustrate a door assembly mounted within the house unit and including a door frame 53 within which the door 52 is supported.

The ventilation and exhaust system illustrated in FIGS. 13 and 14 includes a chimney extension 54, an outer pipe 55 for fresh air ventilation, with a series of flap doors 56 controlling the air flow through pipes 55 and a rope and pulley system 57 and 58 for opening and closing the flap doors. As indicated previously, the ventilation assembly is readily mountable through the flanged opening in the upper end of the house unit.

As shown in FIG. 15, the wall structure may comprise a load bearing structural layer 59 fabricated on a form illustrated in FIGS. 25 to 28 from such materials as reeds, stalks of plants, bamboo, pipes, tubes, bars and the like and natural or artifical materials. On the outer surface of this binding, a layer 61 of outside waterproof cement plaster reinforced with suitable mesh material 62 is placed, while an inner layer 63 of plaster is placed to form the inside wall.

The wall construction illustrated in FIG. 16 includes an interemdiate layer 65 formed from foamed light concrete or other light and good thermally insulating material reinforced by a mesh material 64 and having an outer waterproof covering or plaster 66 and inner wall covering 67 which may be painted in the usual manner.

In FIG. 17, the wall construction may include an outer layer 68 formed from an artificial plastic material which may be pressed or molded in cupola shaped sheets in the molds 104 and 105 shown in FIG. 31, a thermally insulating layer 69, and inner plaster walls 71.

The construction of FIG. 18 includes a reinforcing mesh 72 which pressed sawdust, shredded paper or other suitable material 73 mixed with lime, and outer sprayed plastic emulsion coating 74, and an inner painted wall surface 75.

While the construction of FIGS. 15–18 have been illustrated, it is understood that various other wall constructions may be employed to provide the desired wall characteristics of the invention.

Figure 21:
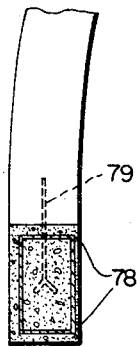
Figure 22:
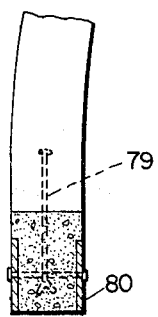

Referring now to FIGS. 21-24, the base ring or rim structure on which the house unit is fixed may take several forms, for example, ring 78 in FIG. 21 includes a reinforced concrete bottom fastened to the wall structure by a hooked bolt 79. In FIG. 22, the base ring is additionally provided with iron plates 80 along the edges thereof.

Figure 23:
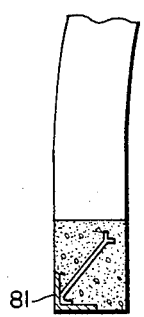
Figure 24:
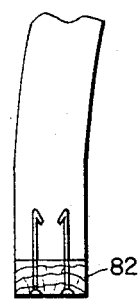

In FIG. 23, an angle beam 81 forms the edge of the base ring, and in FIG. 24, the base ring 82 is constructed of a material such as wood.

The forms on which the intermediate load bearing structure such as the woven reeds or bambo plants are formed is illustrated in FIGS. 25-28. The apparatus includes spaced wood paneling 83 around which the reeds 88 are woven, horizontal slits 84 which enable the basket constructed of the reeds or stalks to be bound together, a scaffolding 85 employed by workers, a window frame 86 and door frame 87, and ladders 89, 90 and 91 to provide access over the entire height of the basket and internal supports 92 of the form structure itself. In making the woven basket, reeds or other similar material 88 are placed outside the casing and then bound simultaneously together from each side by passing soft iron wire through slits 84. The basket is inserted at its upper end within the flanged ring 76 and under some conditions may be directly connected to a base ring or rim as it is retained on the form structure itself.

When finished, the basket is then transferred to the apparatus illustrated in FIGS. 29 and 30 where it is held while the inner and outer walls are sprayed thereon. The spraying or coating apparatus includes a curved trowel 94 for smoothing the inner plaster wall, the trowel being rotatable about the axes 96 and 95 and guided by the roller track rail 97. The outer wall surface is smoothed by a similar trowel assembly including a curved plank trowel 94a guidedly rotated on tracks 97a. The inner and outer plaster walls are sprayed on the woven basket by suitable nozzle assemblies 102. In addition, the trowel assemblies 94 and 94a are carried by crane 100 for reciprocable movement along the movable bridge device 98 mounted on rails 99.

The wall structure, instead of including the woven reed basket 88, may comprise such intermediate lightweight insulating material such as light Beton or foamy or bubbling concrete, reinforced with mesh and plastered internally and externally with suitable plaster of Paris. The intermediate layer of load bearing material may be molded in the apparatus illustrated in FIGS. 31-33 which includes an exterior mold 104, a spaced interior mold 105, between which the moldable material is injected by the gun 102. A trestle 106 pivotally supports at 107 a base frame 108 in which the molds are mounted. A pair of guide track beams 109 and 110 extend between frame members 108 and provide tracks along which fastening beams 11 and 112 including roller assemblies 114 are movable. A rotatable ring 113 to which the mold structure is fixed is mounted on beam 112 and rotatably driven by a motor assembly 132. A vibration device 116 mounted on ring 113 is employed to uniformly distribute the material within the mold and provide a uniform product throughout.

In FIG. 34, the manner in which a finished house room unit is transported to a building site is illustrated. A crane 119 including a chain 121 and hook assemblies 123 held apart by a spanning beam is inserted within the flanged upper opening of the house unit, with the hooks 123 then being spread apart and inserted underneath the bottom rim of the unit which then absorbs all of the load bearing forces during transportation of the unit.

It is readily apparent therefore that the above described embodiments provide a monolithic readily transportable housing unit very useful in possessing good thermal insulating qualities while at the same time having sufficient structural stability and load bearing capacity to function as a normal housing unit. The unit is constructed of very cheap lightweight materials and several units may be employed together to obtain living quarters of a desired capacity.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A monolithic transportable housing unit comprising a prefabricated house room unit having around its lower open end a rim incorporating means adapted to cooperate with means on a fixed base at a selected site for mounting the house room unit in its desired location, said house room unit being made of lightweight materials in moulds of required shape and size and composed of spaced inner and outer wall members and good thermally insulating material located between said wall members, an opening in the top of said house room unit, a flanged ring positioned in said opening with its flanges reinforcing and fastening said inner and outer walls together and providing an access opening through which a lifting mechanism may be inserted for transportation of the house room unit as a whole from a place of fabrication such as a factory to its destination such as a housing location, said ring also serving to receive a chimney if necessary.

2. The housing unit defined in claim 1, wherein said house room unit comprises substantially continuous inner and outer walls of preformed plastic material.

3. The housing unit defined in claim 1, wherein said house room unit comprises a skeleton frame in required shape onto which is sprayed material to harden in situ to provide said inner and outer walls.

4. The housing unit defined in claim 1, wherein said house room unit comprises a structure the outer surface of which is made of pressed metal sheet as the outer wall, and the inner surface of which is plastered to provide said inner wall and thermal insulation between said walls.

5. The housing unit defined in claim 1, wherein said house room unit is a cast unit of lightweight concrete foam having a waterproof layer as an outer wall and internal plastering as the inner wall.

6. The housing unit defined in claim 1, wherein the outer wall is a molded external crust on the inside of which is disposed a layer of thermal insulation that in turn engages an inner plastered wall.

7. The housing unit defined in claim 1, wherein said house room unit comprises a core of molded thermal insulation material on the outer surface of which is an outer wall in the form of a sprayed-on waterproof coating, and the inner wall being a layer of material on the inner surface of the core.

8. In the housing unit defined in claim 1, said opening also serving as a ventilation opening when the house room unit is mounted on its base.

9. In the housing unit defined in claim 1, said house room unit having a plurality of internal walls separating its interior into rooms.

10. The housing unit defined in claim 1, wherein the unit is formed with reinforcing ribs.

References Cited

UNITED STATES PATENTS

| | | | |
|---|---|---|---|
| 955,794 | 4/1910 | Harry | 52—199 X |
| 1,060,347 | 4/1913 | Massey | 52—82 |
| 2,187,223 | 1/1940 | Cory | 52—236 X |
| 2,278,956 | 4/1942 | Wagner | 51—81 |
| 2,324,911 | 7/1943 | Corbetta | 264—32 |

(Other references on following page)

UNITED STATES PATENTS

| | | | |
|---|---|---|---|
| 2,335,300 | 11/1943 | Neff | 264—32 |
| 2,365,145 | 12/1944 | Neff | 52—80 |
| 2,469,603 | 5/1949 | Le Tourneau | 52—80 |
| 2,499,478 | 3/1950 | Feser | 52—81 |
| 2,690,185 | 9/1954 | Pomykala | 52—80 X |
| 3,030,259 | 4/1962 | Long | 156—245 |
| 3,159,943 | 12/1964 | Sugar et al. | 52—408 X |
| 3,172,392 | 3/1965 | Schultz | 52—80 X |

FOREIGN PATENTS

| | | |
|---|---|---|
| 127,493 | 4/1948 | Australia. |

OTHER REFERENCES

Journal of the American Concrete Institute, TA-681.A61, 1936, pp. 375–382.

Science News Letter, vol. 77, No. 1, Jan. 2, 1960, p. 7.

ALFRED C. PERHAM, Primary Examiner

U.S. Cl. X.R.

52—79, 122, 143, 199; 164—32